Oct. 22, 1935.   LE ROY NORCROSS ET AL   2,018,279

WEED PULLER

Filed Sept. 7, 1934

Inventors
Le Roy Norcross
Theo. E. Samuelson
By Eugene Stevens
Attorney

Patented Oct. 22, 1935

2,018,279

UNITED STATES PATENT OFFICE 2,018,279

WEED PULLER

Le Roy Norcross and Theodore E. Samuelson, Bushnell, Ill.

Application September 7, 1934, Serial No. 743,148

2 Claims. (Cl. 55—65)

Our invention relates to improvements in weed pulling tools and is especially useful for pulling dandelions or plantain from lawns.

Briefly stated, the objects of the invention are,—(1) to provide a tool of this kind which may be easily and efficiently operated in dry, hard ground, and which operates equally well upon large and small weeds; (2) to provide a tool which while efficiently removing weeds will extract but a minimum amount of soil so as not to mar the appearance of the lawn; and (3) to furnish a weeding tool which is simple in construction, strong and durable, and which makes for much more rapid weeding than is possible with tools of the prior art.

The invention also resides in certain novel features of construction, combination and arrangement of the various parts as will be more apparent upon reference to the accompanying drawing in connection with the detailed description appearing hereinafter.

In the drawing, we have illustrated what appears to be a preferred example of the invention, but it will be understood that same is susceptible of other mechanical expressions within the spirit and scope of the subject matter claimed hereinafter.

Referring to the several views incorporated in the drawing.

Figure 1:
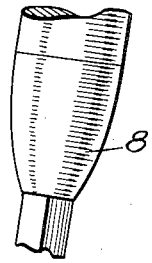
Figure 1 is side elevational view of a tool incorporating our invention, certain parts being shown broken away.

Referring to the drawing wherein the same reference characters have been used to designate the same parts throughout the several views, numeral 7 denotes the shank of the tool which may be of any desired length or cross section, and may have a T handle such as 8.

Figure 3:
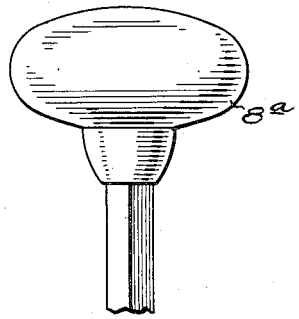
Figure 3 is a rear elevational view of the device as shown in Figure 2.

The extracting blade is generally designated as at 9 and is shown as having been forged from the stock of the shank 7, the shank being shown as providing a reinforcement or backing 7a for the blade 9 (Figs. 1 and 3).

The blade 9 is made very thin and its ground engaging or entering end 9a is provided with the medial cut-out 10 which facilitates entry into the ground.

Figure 2:
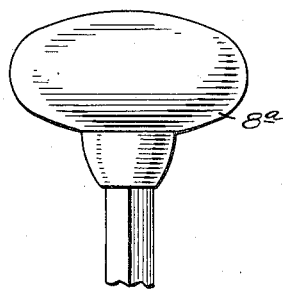
Figure 2 is a front view of the device illustrating a different form of handle from that suggested in Figure 1.
Figure 4:
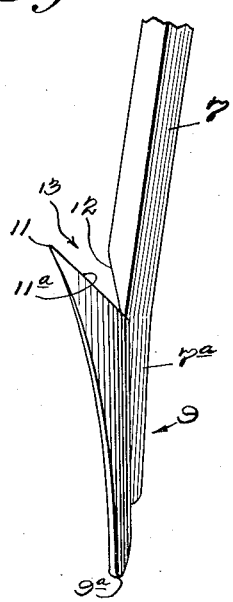
Figure 4 is a detail view illustrating the blade portion in longitudinal section and showing a fragment of the shank.
Figure 4:
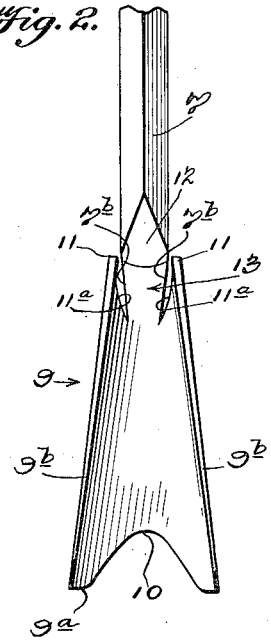
Figure 4:
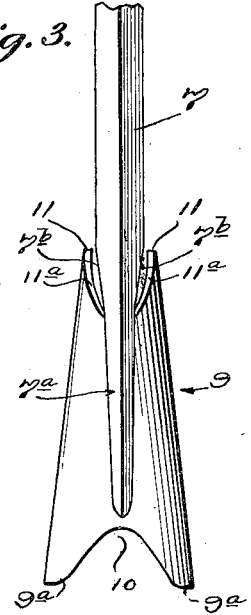
Figure 4:
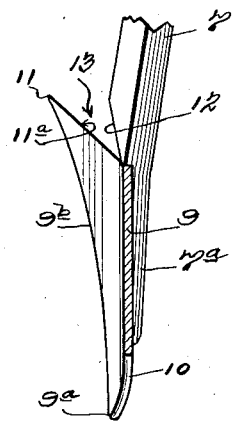
Figure 5:
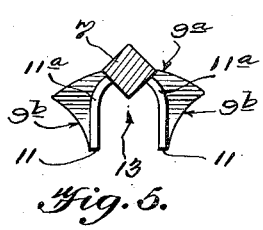
Figure 5 is a cross sectional view taken through the shank and looking in the direction of the blade.
Figure 6:
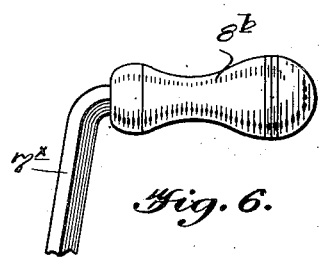
Figure 6 is a detail view illustrating a form of handle and shank construction which may be used.

Figures 1 and 4 indicate that the shank 7 angles off rearwardly from the upper end of the blade and that such shank has an inward bevel extending toward the blade 9, as indicated at 12 while at the opposite sides of the inwardly beveled surface 12 the shank is beveled inwardly as indicated at 7b in Figs. 2 and 3. The purpose of this construction will be more apparent hereinafter.

The blade 9 is shown as being straight in the direction of its length, or substantially so. Such blade portion 9 if spread out flat would be of substantially the same width throughout according to the particular form of blade shown in the drawing, but it is to be understood that this characteristic is not essential.

According to the preferred form of the invention as shown, the blade 9 is bent outwardly to provide the substantially U-shaped throat 13, the bight portion of which throat is provided by the face bevel 12 of the shank 7. The top outer corners of the sides 9b of the blade 9 are cut inwardly at an acute angle so as to provide prongs 11 disposed outwardly of the portions 7b of the shank as indicated in Figure 2. The bias cut top edges of blank 9 are indicated at 11a and they constitute supporting surfaces for the crown of a weed which, as will be hereinafter explained, is adapted to be wedged in between the surfaces 11a and the surface 12 of the shank which, as stated, provides the bight portion of the U-shaped throat 13.

Figure 2 illustrates that the throat 13 tapers outwardly in the direction of the entry end 9a of the blade so that the blade has, when viewed in front or rear elevation as in Figs. 2 and 3, a sort of frusto conical form.

The side edges 9b of the blade 9 provide what might be termed outwardly flaring wings, while the top edges 11a of the prongs 11 function with the inwardly beveled front surface 12 of the shank 7 to provide what amounts to a wedge-shaped pocket into which the crown of the weed is wedged when the tool is pulled inwardly.

The operation of the device may be summarized as follows:

The blade 9 is inserted downwardly along the root of the weed to, or substantially to, the lower end of said root. Then the shank 7 is rocked forwardly to project the prongs 11 under the crown of the weed so that the shank 7 will be disposed perpendicular or substantially so with respect to the ground. Then the shank 7 is pulled upwardly causing the crown of the weed to wedge into the pocket formed by the edges 11a and the shank surface 12. The weed is readily pulled up. The forward rocking of the shank 7 and blade 9 causes the side roots or branches of the main root to be gathered into the channel of blade 9 and also moves the whole root array forwardly clearing same of the dirt which is about one-half of the root structure. Thus when the tool is pulled up with the weed very little dirt comes up with it, and the outwardly flared lower part of the blade 9 permits loose dirt to fall down. In this way no large holes are made in the lawn by the use of the tool.

What we claim as new is:

1. A weed pulling tool comprising a handle-providing shank, a blade extension at one end of said shank, said blade being substantially straight in the direction of its length and providing a constricted substantially U-shaped weed receiving throat adjacent the junction of the handle with the blade, said blade throat flaring outwardly to the ground entering end of the blade, and the top edges of said throat being cut on a bias inwardly from the outer edges toward the shank, whereby to provide prongs adapted to be rocked beneath the crown of a weed after the blade has been inserted downwardly along the weed root, the bias cut edges providing supporting shoulders for the weed crown so that the same can be readily pulled up.

2. A weed pulling tool comprising a handle-providing shank, a blade extension at one end of said shank, said blade being substantially straight in the direction of its length and providing a constricted substantially U-shaped weed receiving throat adjacent the junction of the handle with the blade, said blade throat flaring outwardly to the ground entering end of the blade, the top edges of said throat being cut on a bias inwardly from the outer edges toward the shank, whereby to provide prongs adapted to be rocked beneath the crown of a weed after the blade has been inserted downwardly along the weed root, the bias cut edges providing supporting shoulders for the weed crown so that the same can be readily pulled up, and said shank being connected to said blade at the bight portion of said throat and inclined at a rearward angle, said shank adjacent said prongs having its front and side faces beveled to provide clearance between the prongs and shank, and a seat or pocket for receiving the crown of the weed.

LE ROY NORCROSS.
THEODORE E. SAMUELSON.